United States Patent
Riess et al.

(10) Patent No.: US 12,341,388 B2
(45) Date of Patent: Jun. 24, 2025

(54) METHOD FOR PRODUCING A STATOR FOR AN ELECTRICAL MACHINE

(71) Applicant: Schaeffler Technologies AG & Co. KG, Herzogenaurach (DE)

(72) Inventors: Stefan Riess, Kaufering (DE); Michael Menhart, Igling (DE); Johann Oswald, Eschenlohe (DE); Oliver Steffen, Herzogenaurach (DE); Johannes Goesswein, Heroldsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 143 days.

(21) Appl. No.: 17/622,907

(22) PCT Filed: Jun. 4, 2020

(86) PCT No.: PCT/DE2020/100467
§ 371 (c)(1),
(2) Date: Dec. 27, 2021

(87) PCT Pub. No.: WO2020/259746
PCT Pub. Date: Dec. 30, 2020

(65) Prior Publication Data
US 2022/0271632 A1 Aug. 25, 2022

(30) Foreign Application Priority Data
Jun. 27, 2019 (DE) .......................... 102019117308.6

(51) Int. Cl.
*H02K 15/066* (2025.01)
*H02K 15/021* (2025.01)
(Continued)

(52) U.S. Cl.
CPC ......... *H02K 15/066* (2013.01); *H02K 15/021* (2025.01); *H02K 15/0433* (2025.01);
(Continued)

(58) Field of Classification Search
CPC ..................... H02K 15/0478; H02K 15/066
See application file for complete search history.

(56) References Cited

U.S. PATENT DOCUMENTS

| 2007/0143983 A1 | 6/2007 | Yamaguchi et al. |
| 2011/0174037 A1 | 7/2011 | Akimoto et al. |

(Continued)

FOREIGN PATENT DOCUMENTS

| CN | 102761208 A | 10/2012 |
| DE | 102016212382 A1 * | 1/2018 |

(Continued)

*Primary Examiner* — Livius R. Cazan
(74) *Attorney, Agent, or Firm* — Volpe Koenig (57) ABSTRACT

A method for producing a stator for an electrical machine, the stator having a substantially hollow-cylindrical stator core, which has a plurality of grooves spaced apart in a circumferential direction, the method including: providing at least one strip-shaped winding unit having a first winding conductor with a plurality of groove portions running straight in a transverse direction that are mutually parallel; fastening a first end of the winding unit to a lateral surface of a mandrel; winding the winding unit onto the mandrel such that it is bent around the lateral surface of the mandrel spirally; inserting the mandrel, together with the winding unit, into a cavity in the stator core; and unwinding the winding unit from the mandrel with the groove portions of the winding unit being inserted into the grooves of the stator core.

14 Claims, 7 Drawing Sheets

(51) Int. Cl.
*H02K 15/043* (2025.01)
*H02K 1/16* (2006.01)
*H02K 3/12* (2006.01)
*H02K 3/28* (2006.01)
*H02K 3/48* (2006.01)

(52) U.S. Cl.
CPC ............... *H02K 1/165* (2013.01); *H02K 3/12* (2013.01); *H02K 3/28* (2013.01); *H02K 3/48* (2013.01)

(56) References Cited

U.S. PATENT DOCUMENTS

| | | |
|---|---|---|
| 2012/0217836 A1 | 8/2012 | Watanabe et al. |
| 2013/0214634 A1 | 8/2013 | Hasegawa et al. |
| 2018/0233999 A1* | 8/2018 | Ponzio ................... H02K 3/12 |
| 2019/0260249 A1* | 8/2019 | Oka ........................ H02K 3/14 |

FOREIGN PATENT DOCUMENTS

| | | |
|---|---|---|
| DE | 102020103165 | 11/2020 |
| JP | 2004072839 A | 3/2004 |
| WO | 2017102892 | 7/2017 |

* cited by examiner

METHOD FOR PRODUCING A STATOR FOR AN ELECTRICAL MACHINE

CROSS-REFERENCE TO RELATED APPLICATIONS

This application is the U.S. National Phase of PCT Appln. No. PCT/DE2020/100271, filed Apr. 1, 2020, which claims priority from German Patent Application No. 10 2019 115 109.0, filed Jun. 5, 2019, and German Patent Application No. 10 2019 116 439.7, filed Jun. 18, 2019, the entire disclosures of which are incorporated by reference herein.

TECHNICAL FIELD

The disclosure relates to a method for producing a stator for an electrical machine, the stator having a substantially hollow-cylindrical stator core, which has a plurality of grooves spaced apart in a circumferential direction, which grooves have a depth in the radial direction.

BACKGROUND

In electrical machines which have a stator with a hollow-cylindrical stator core, i.e., which are designed as internal rotor machines, a stator winding made of a round wire can be inserted, for example, by means of a draw-in method. Electrical machines that are designed for use as a traction drive in a vehicle often have a stator winding with a rectangular cross-section in order to achieve a higher power density. Such stator windings cannot be inserted into the stator core by means of the draw-in method.

In electrical machines for vehicles, the stator windings are therefore typically designed as hairpin windings. Here, substantially U-shaped wire segments are inserted into the grooves from one end face of the stator core and then formed at an opposite end face and joined, for example, by welding. This results in an increased amount of work.

An alternative to a hairpin winding is the use of a bar wave winding, which can be prefabricated separately from the stator core. For insertion into the grooves of the stator core, the bar wave winding is typically compressed in the radial direction of the stator core to reduce its diameter and then expanded in the radial direction to insert the winding conductor of the bar wave winding into the grooves of the stator core. This process may cause undesirable damage to the winding conductor.

SUMMARY

With this in mind, it is the object of the present disclosure to reduce the risk of damage to the winding conductor when it is inserted into the stator core.

To achieve the object, a method for producing a stator for an electrical machine, the stator having a substantially hollow-cylindrical stator core, which has a plurality of grooves spaced apart in a circumferential direction, which grooves have a depth in the radial direction, is proposed with the following method steps:
  providing at least one strip-shaped winding unit, which comprises a first winding conductor having a plurality of groove portions running straight in a transverse direction of the winding unit, which groove portions are mutually parallel;
  fastening a first end of the strip-shaped winding unit to a lateral surface of a mandrel, the mandrel having an outside diameter smaller than an inside diameter of the stator core;
  winding the strip-shaped winding unit onto the mandrel such that the strip-shaped winding unit is bent around the lateral surface of the mandrel, in particular spirally;
  inserting the mandrel, together with the strip-shaped winding unit, into a cavity in the stator core;
  unwinding the strip-shaped winding unit from the mandrel inserted into the cavity, the groove portions of the strip-shaped winding unit being inserted into the grooves of the stator core.

In the method according to the disclosure, it is not necessary to compress and expand the strip-shaped winding unit in the radial direction of the stator core. Rather, the prefabricated strip-shaped winding unit is wound around the mandrel in such a way that, in the wound state, it has an outside diameter that is smaller than the inside diameter of the stator core. Together with the mandrel, the wound strip-shaped winding unit is inserted into the cavity of the stator core and unwound inside the cavity to insert the groove portions of the strip-shaped winding unit into the grooves of the stator core. In this way, radial compression and expansion of the winding conductor is avoided. The risk of undesirable deformation and/or damage to the winding conductor can be reduced, allowing insertion into the stator core that is gentle on the winding conductor.

The stator core of the stator is preferably designed as a laminated core.

According to an advantageous embodiment, it is provided that, for winding the strip-shaped winding unit, the mandrel is rotated in a first direction of rotation and, for unwinding the strip-shaped winding unit, the mandrel is rotated in a second direction of rotation opposite to the first direction of rotation. Such an embodiment of the method according to the disclosure offers the advantage that both winding and unwinding can be performed by a rotary movement of the mandrel. It is therefore not necessary to twist the at least one strip-shaped winding unit relative to the mandrel. It is advantageous if the strip-shaped winding unit is limited by a radial stop in radial direction while the mandrel is rotated for winding. This allows the strip-shaped winding unit to be moved in the direction of the lateral surface of the mandrel.

According to an alternative, advantageous embodiment, it is provided that the mandrel for winding the strip-shaped winding unit is rotated in a first direction of rotation and the stator core for unwinding the strip-shaped winding unit is rotated in the second direction of rotation with the mandrel being stationary.

According to a preferred embodiment, a plurality of strip-shaped winding units is provided and the ends of these strip-shaped winding units are fastened to the lateral surface of the mandrel with a predetermined angular spacing. By using a plurality of winding units whose ends fastened to the lateral surface are spaced apart from each other, a stator winding designed as a stepped wave winding can be formed.

In this context, it has proven advantageous if the plurality of strip-shaped winding units is wound onto the mandrel in such a manner that the strip-shaped winding units are arranged in a spirally extending manner bent around the lateral surface of the mandrel. The strip-shaped winding units are preferably wound onto the mandrel by rotating the mandrel. Unwinding of the strip-shaped winding units after insertion into the cavity of the stator core can also be done by rotating the mandrel, but in the opposite direction of rotation, as explained earlier.

Preferably, the first winding conductor has a rectangular, in particular square, cross-section. The winding conductor of the strip-shaped winding unit can thus form a bar winding, in particular a bar wave winding, in the stator core.

According to an advantageous embodiment, it is provided that the lateral surface of the mandrel comprises a receiving wall extending in radial direction, to which the first end of the strip-shaped winding unit is fastened. The radial direction is understood to mean, with respect to the mandrel, a direction perpendicular to a longitudinal axis of the mandrel, in particular a longitudinal axis about which the mandrel is rotated to wind the at least one strip-shaped winding unit. Preferably, the receiving wall is part of a step in the lateral surface. Preferably, the height of the step or the radial extension of the receiving surface corresponds to the thickness of the strip-shaped winding unit. This makes it possible for the lateral surface beyond the step to form a common outer contour together with an outer side of the winding unit fastened to the receiving surface. Another strip-shaped winding unit can optionally be wound onto this outer contour.

An embodiment in which the first winding conductor is guided in a first and a second layer of the winding unit has proven to be particularly advantageous and comprises:
a. a plurality of first bent end sections, each connecting two groove portions and arranged on a first longitudinal side of the winding unit,
b. a plurality of second bent end sections each interconnecting two groove portions and arranged on a second longitudinal side of the winding unit opposite to the first longitudinal side, wherein
c. all first bent end sections each interconnect a groove portion in the first layer and a groove portion in the second layer,
d. exactly one second bent end section for forming a reversal point of the winding conductor either
   i. interconnects two groove portions in the first layer or
   ii. interconnects two groove portions in the second layer,
and all the remaining second bent end sections each interconnect a groove portion in the first layer and a groove portion in the second layer.

In such a strip-shaped winding unit, the groove portions extending in a transverse direction are each arranged in one of two layers so that a strip-shaped winding unit with a small thickness, in particular with a thickness of only two layers, is obtained. This results in a winding unit that can be inserted into the grooves of a stator core with reduced effort. By forming a reversal point of the winding conductor, it is possible for the winding unit to have two winding terminals provided on the same longitudinal side of the strip-shaped winding unit and in the same position of the winding unit. When the winding unit is arranged in a stator core, these winding terminals can be arranged on the same end face of the stator core and either both radially on the inside or both radially on the outside, so that the effort required to contact the winding terminals is reduced.

For the purposes of the disclosure, a straight groove portion means a straight section of winding wire that can be inserted into a groove of a stator core to form a stator winding. Such groove portions, which are arranged in the same position of the winding unit, are preferably provided to be spaced apart by identical distances in parallel. Alternatively, it is preferred that the groove portions are spaced apart from each other in parallel over different distances. For this purpose, the bent end sections can have different configurations, in particular different configurations with regard to their length and/or their curvature. In the context of the disclosure, a bent end section is an end section that does not run straight. The end section can effect a reversal of the winding conductor by essentially 180°. The bent end section can have an arc-like curvature and/or a bending point. For example, the bent end section can comprise a first and a second essentially straight subsection, which are interconnected via a bending point. With such bent end sections that interconnect a groove portion in the first layer and a groove portion in the second layer, it is preferable that the first straight subsection is arranged in the first layer and the second straight subsection in the second layer so that a change of position at the bending point is realized.

According to an advantageous embodiment, it is provided that the first winding conductor has two connection sections, which are either both arranged on the first longitudinal side or both are arranged on the second longitudinal side. The winding conductor of the winding unit can be contacted via the connection sections. The arrangement of the connection sections on the same side facilitates the contacting of the connection sections, in particular the contacting of connection sections of a first strip-shaped winding unit with a second strip-shaped winding unit.

In this context, it is advantageous if the connection sections are either both arranged in the first layer or both are arranged in the second layer. By arranging the connection sections in the same layer, it becomes possible that the connection sections can all be arranged radially on the outside when the winding unit is arranged in a stator core. This can reduce the effort involved in making contact with the connection sections. Alternatively, the connection sections can all be arranged radially on the inside in the stator core. As a further alternative, it is possible for a first of the two connection sections to be arranged in the first layer and a second of the two connection sections to be arranged in the second layer.

In a preferred embodiment, the winding unit includes one or more second winding conductors formed identically to the first winding conductor and arranged to be offset in such a manner that the first and second winding conductors are arranged in the same first and second layers of the winding unit. Preferably, the groove portions of the second winding conductors are arranged to be offset from the groove portions of the first winding conductor. Thus, a winding unit having a plurality of winding wires can be obtained which has a small thickness of only two layers. Such a winding unit having a plurality of winding wires will also be referred to below as a winding mat. The winding wires of the winding unit can optionally be interconnected in series or in parallel. For this purpose, the connection sections of the first winding unit or one or more of the second winding units are preferably connected to one another in a suitable manner.

According to an advantageous embodiment, the stator core is provided with a plurality of grooves spaced apart in a circumferential direction and having a depth extending in the radial direction and allowing groove portions of the strip-shaped winding unit to be arranged in a plurality of radially spaced apart radial positions, the groove portions being received in the grooves of the stator core such that the strip-shaped winding unit is spirally arranged in the stator core. In terms of the disclosure, the fact that the strip-shaped winding unit is arranged spirally in the stator core means that the individual groove portions of the winding unit are received in different radial positions in the grooves of the stator core in such a way that a first radial position of a first groove portion, which is at a greater distance from the reversal point of the winding unit, is located radially further out than a second radial position of a second groove portion, which is at a smaller distance from the reversal point. A third radial position of a third groove portion is preferably located radially farther inward than the second radial position, wherein the third groove portion is at an even smaller distance from the reversal point or respective end of the winding conductor than the second groove portion. In this respect, the individual groove portions of the winding unit are received in different radial positions in the grooves of the stator core in such a way that the radial positions of the groove portions are provided radially further inward depending on their distance from the reversal point of the winding unit.

In this context, it is preferred if the groove portions are spaced apart from each other in parallel over different distances so that the groove portions can be arranged in different radial positions. As a result, this can reduce the risk of undesirable deformation of the winding conductor, particularly in the area of the groove portions, and/or make it easier to insert the groove portions into the grooves of the stator core.

According to an advantageous embodiment, the groove portions of the strip-shaped winding unit are inserted into the grooves of the stator core by means of a positioning device. Preferably, the positioning device positions a groove portion parallel to a groove so that it can be inserted into the groove. Alternatively, the positioning device can position several adjacent groove conductors parallel to several grooves. Particularly preferably, the groove portions of the strip-shaped winding units are inserted into the grooves of the stator core by means of several positioning devices, the groove portions of one winding unit each being positioned by means of exactly one positioning device. It is advantageous if the plurality of positioning units position the groove portions of the plurality of winding units simultaneously in parallel to the respective grooves.

BRIEF DESCRIPTION OF THE DRAWINGS

Further details and advantages of the disclosure will be explained below with reference to the exemplary embodiment shown in the drawings. In the figures.

DETAILED DESCRIPTION

Figure 1:
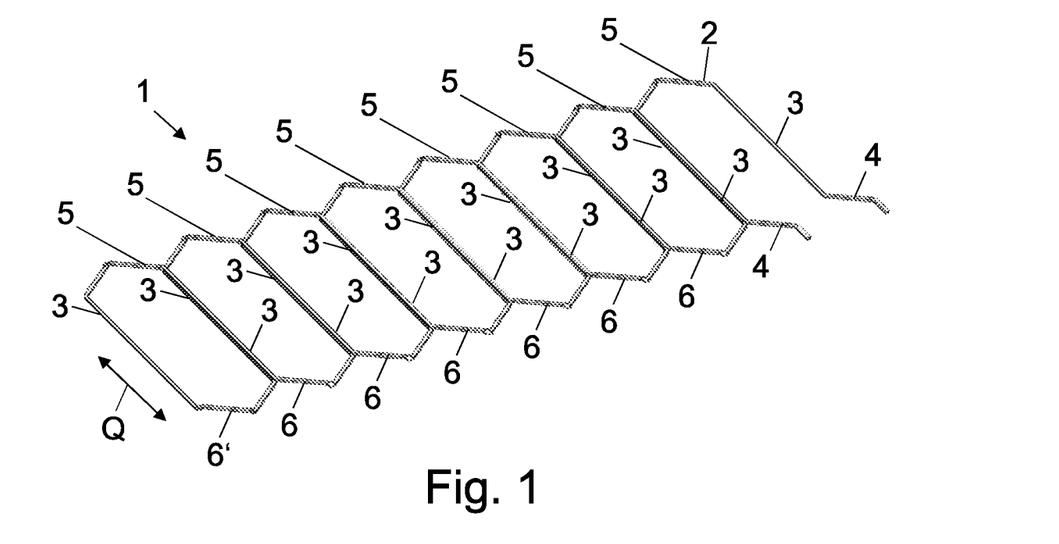
FIG. 1 shows a strip-shaped winding unit according to a first exemplary embodiment in a perspective view.
Figure 2:
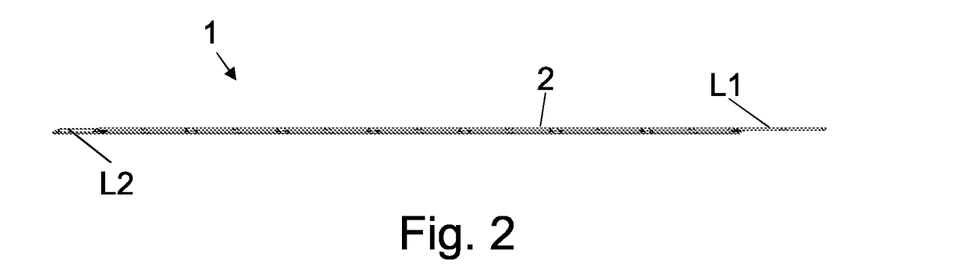
FIG. 2 shows the winding unit according to FIG. 1 in a top view of a longitudinal side.
Figure 3:
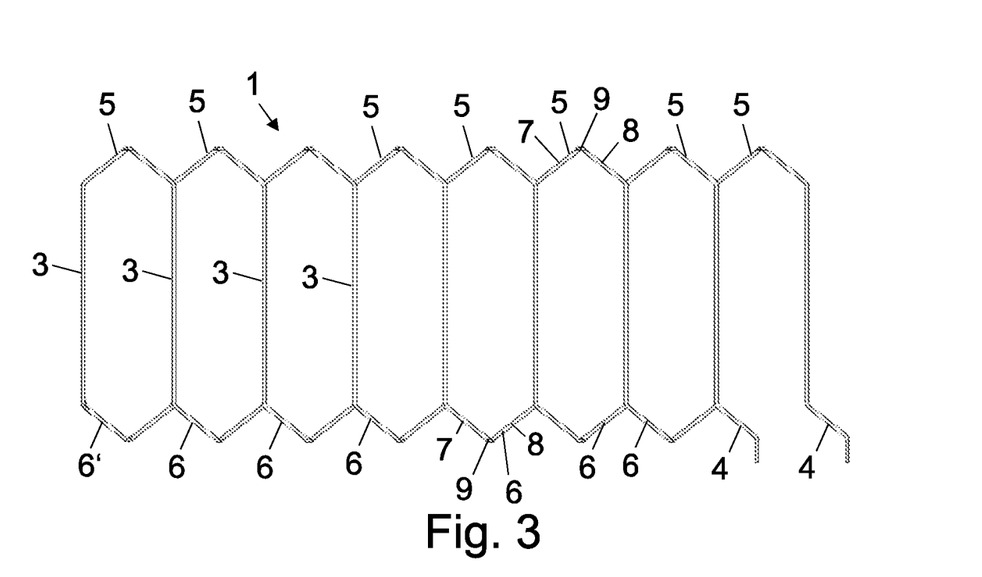
FIG. 3 shows the winding unit according to FIG. 1 in a side view.

FIGS. 1, 2 and 3 show a strip-shaped winding unit 1 with exactly one winding conductor 2, which is guided in a first layer L1 and a second layer L2 of the winding unit 1. The winding unit 1 comprises a plurality of groove portions 3 extending straight in a transverse direction Q of the winding unit 1, which are arranged to be mutually parallel. The distance between the groove portions 3 of the winding conductor 2 is dimensioned such that adjacent groove portions 3 can be inserted into different stator grooves of a stator core of an electrical machine. The groove portions 3 are connected to each other via end sections 5, 6, 6' which protrude from the stator core at the end face in a state in which the groove portions 3 of the winding unit 1 are inserted into the stator grooves of a stator core.

The groove portions 3 are interconnected on a first longitudinal side of the winding unit 1 via a plurality of first bent end sections 5. The first bent end sections 5 each interconnect a first groove portion 3 in the first layer L1 and a second groove portion 3 in the second layer L2. In this respect, the first end section 5 enables a layer change of the winding conductor 2 in each case. On a second longitudinal side of the winding unit 1 opposite the first longitudinal side, a plurality of second bent end sections 6, 6' are provided, each connecting two groove portions 3 and arranged on a second longitudinal side of the winding unit 1 opposite the first longitudinal side. Exactly one second bent end section 6' is thereby designed to form a reversal point of the winding conductor 2 in such a way that it connects two groove portions 3 in the second layer L2. All remaining second bent end sections 6, on the other hand, each connect a first groove portion 3 in the first layer L1 and a second groove portion 3 in the second layer L2.

According to a modification of this exemplary embodiment, it can be provided that the second bent end section 6' provided for forming the reversal point interconnects two groove portions in the first layer.

The strip-shaped winding unit 1 thus has a winding conductor 2 which follows an undulating course starting from a first connection section 4 up to the reversal point. The winding conductor 2 reverses at the reversal point and then again follows an undulating course starting from the reversal point up to a second connection section 4.

The bent end sections 5, 6, 6' of the winding conductor 2 cause the winding conductor to reverse by essentially 180°. The bent end sections 5, 6, 6' each comprise a first substantially straight subsection 7 and a second substantially straight subsection 8, which are connected to each other via a bending point 9.

The winding conductor 2 further comprises two connection sections 4, via which the winding conductor can be contacted. In the present exemplary embodiment, the connection sections 4 are both arranged on the second longitudinal side of the winding unit 1 and are both provided in the same, in this case the first, layer L1 of the winding unit 1.

Figure 4:
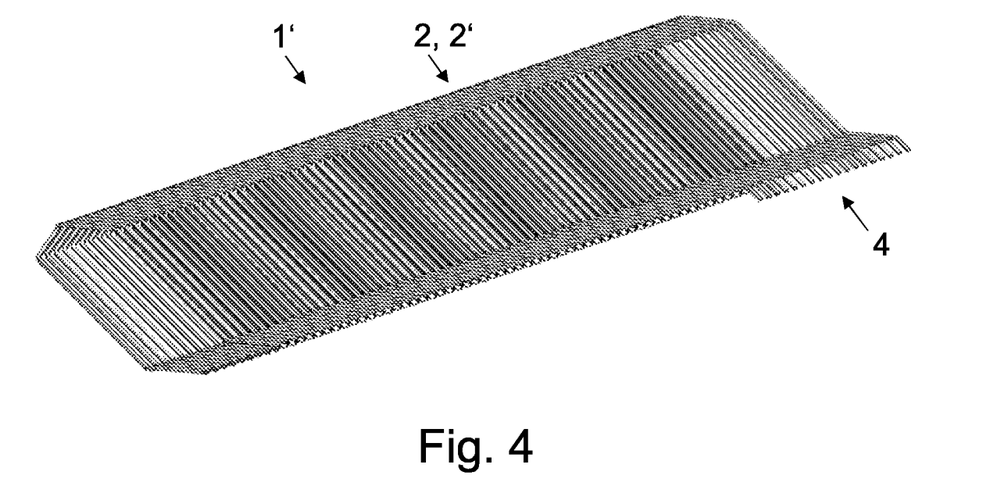
FIG. 4 shows a strip-shaped winding unit according to a second exemplary embodiment in a perspective view.
Figure 5:
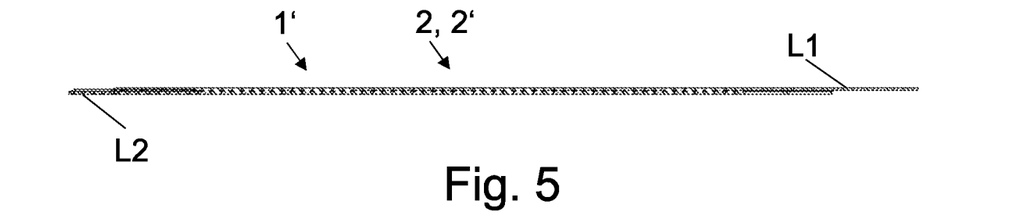
FIG. 5 shows the winding unit according to FIG. 4 in a top view of a longitudinal side.
Figure 6:
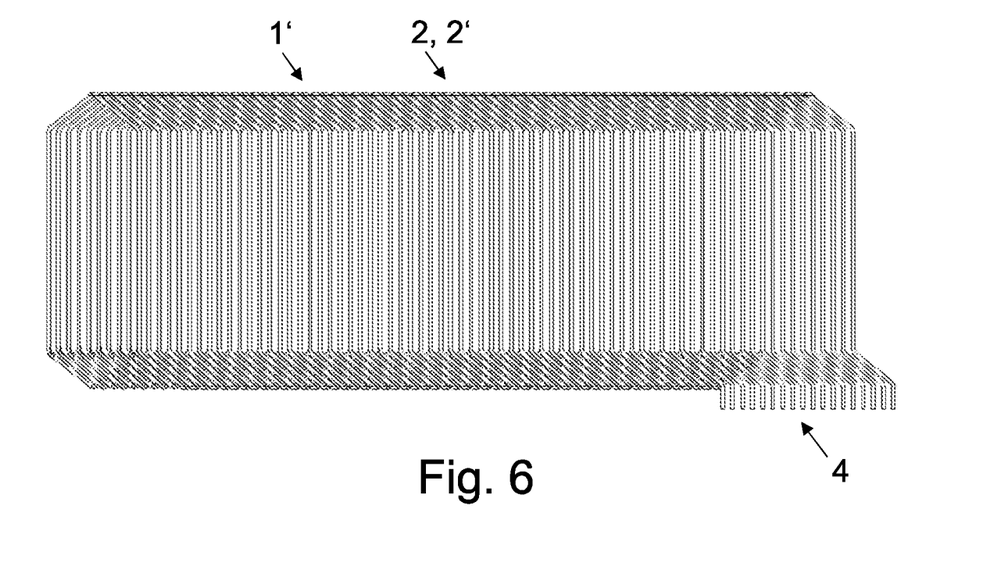
FIG. 6 shows the winding unit according to FIG. 4 in a side view.

The illustrations in FIGS. 4, 5 and 6 show a second embodiment of a strip-shaped winding unit 1', which differs from the winding unit 1 according to the first embodiment in that it comprises a plurality of second winding conductors 2' in addition to the first winding conductor 2. The second winding conductors 2' are formed identically to the first winding conductor 2 and are arranged to be offset in such a way that the first winding conductor 2 and the second winding conductors 2' are arranged in the same first layer L1 and the same second layer L2 of the winding unit 1'. In this respect, the winding unit 1" forms a winding mat with a plurality of winding conductors 2, 2', which can be contacted via a large number of connection sections 4.

Figure 7:
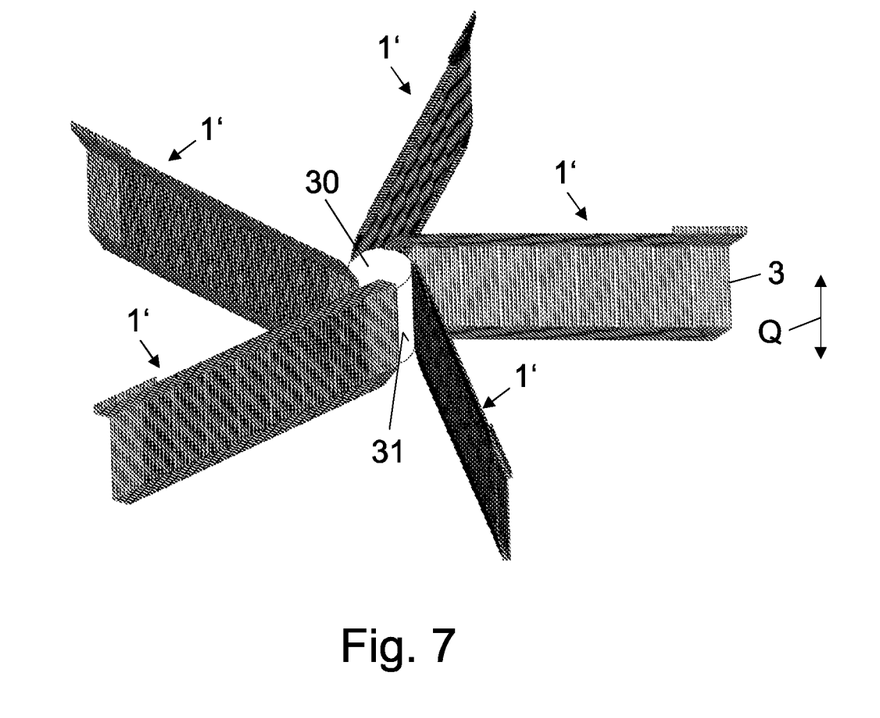
FIG. 7 shows a mandrel with a plurality of winding units in a perspective view.

In the following, the illustrations in FIG. 7 and FIG. 8 will be used to explain an embodiment of the method according to the disclosure for producing a stator for an electrical machine, in which one or more of the strip-shaped winding units shown in FIGS. 1 to 6 can be used. In the method according to the exemplary embodiment, several, in this case five, strip-shaped winding units 1' are first provided. The winding units 1' are designed in the manner of winding mats, each of which has several winding conductors 2, 2' with a rectangular, in particular square, cross-section. As explained above, the winding conductors 2, 2' have a plurality of groove portions 3 extending straight in a transverse direction Q of the winding unit 1' and are arranged to be mutually parallel.

The strip-shaped winding units 1' are fastened to a mandrel 30 in a further method step. The mandrel 30 has a cylindrical or hollow-cylindrical shape and may be formed as a separate component or as part of a manufacturing device for producing the stator. The mandrel 30 used has an outside diameter D1 that is smaller than an inside diameter D2 of the stator core 11 into which the winding units 1' are to be inserted to form the stator, see FIG. 12.

Figure 8:
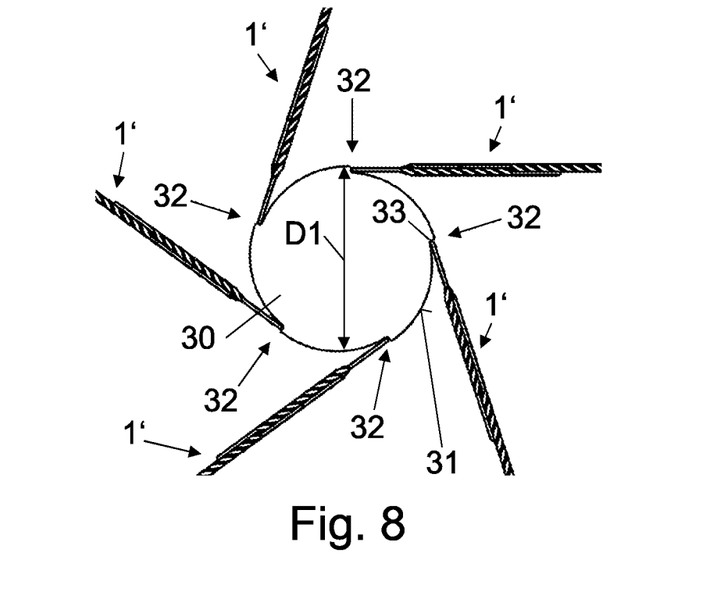
FIG. 8 shows a mandrel with the ends of a plurality of winding units in a side view.

As can be seen in FIG. 8, for example, one end of each of the strip-shaped winding units 1' is fastened to the lateral surface 31 of the mandrel 30. For this purpose, the lateral surface 31 has a plurality of steps 32 comprising a receiving wall 33 for receiving the end of the winding unit 1'. The steps 32 are each provided to be offset from each other by an identical, predetermined angular distance on the lateral surface 31. In the exemplary embodiment, this angular distance is 72°. Deviating from the exemplary embodiment shown in FIG. 8, the steps 32 may each be provided on the lateral surface 31 to be offset from each other by different predetermined angular distances.

Figure 9:
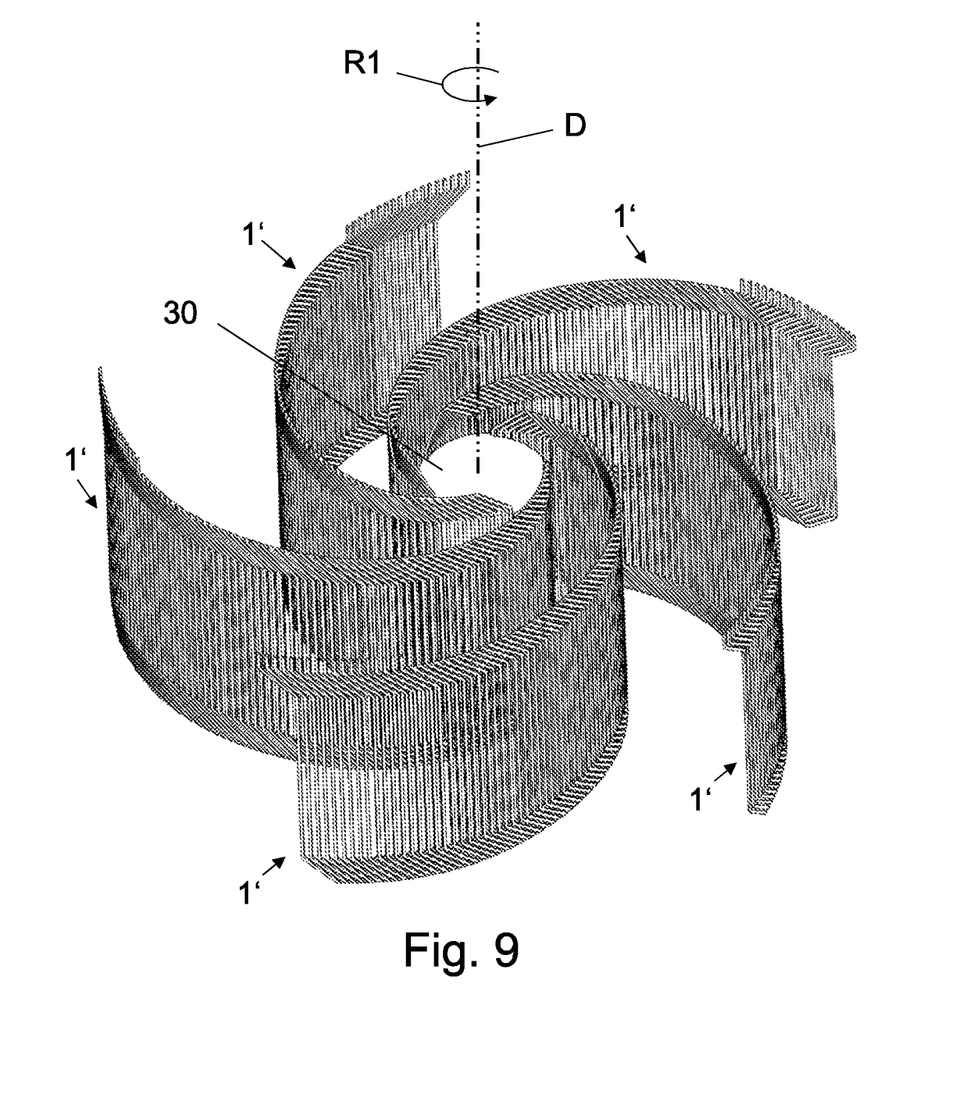
FIG. 9 shows a mandrel with a plurality of winding units as the winding units are wound onto the mandrel in a perspective view.
Figure 10:
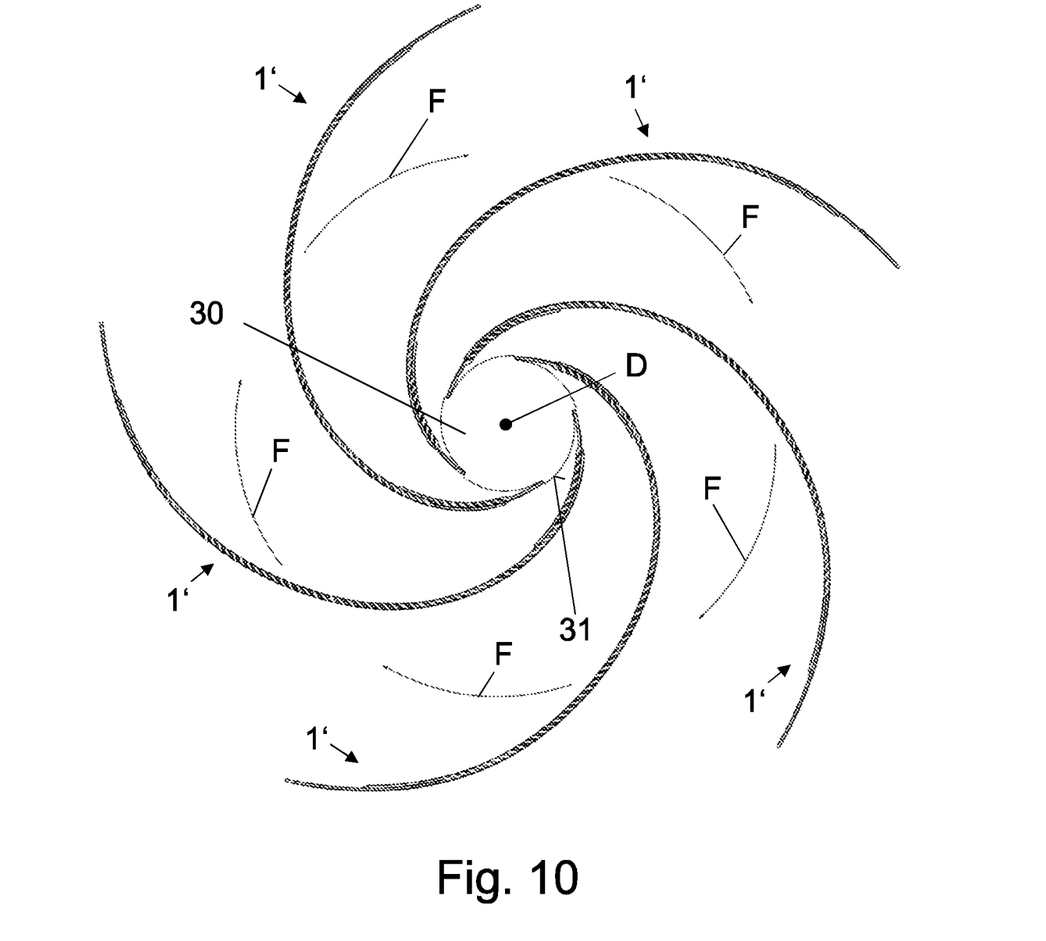
FIG. 10 shows a mandrel with a plurality of winding units as the winding units are wound onto the mandrel in a side view.

In a method step following fastening, the strip-shaped winding units 1' are wound onto the mandrel 30, resulting in spiral bending of the strip-shaped winding units 1' around the mandrel 30. The illustrations in FIG. 9 and FIG. 10 each show a state in which this winding has already begun. In the exemplary embodiment, the winding units 1' are wound by rotating the mandrel 30 in a first direction of rotation R1 about an axis of rotation D corresponding to the longitudinal axis of the mandrel 30. The strip-shaped winding units 1' are moved in the direction of the lateral surface 31 as a result of the rotation of the mandrel 30, as indicated by the arrows F in FIG. 10. In this respect, the winding units 1' are arranged in a spirally extending manner bent around the lateral surface 31 of the mandrel 30.

Figure 11:
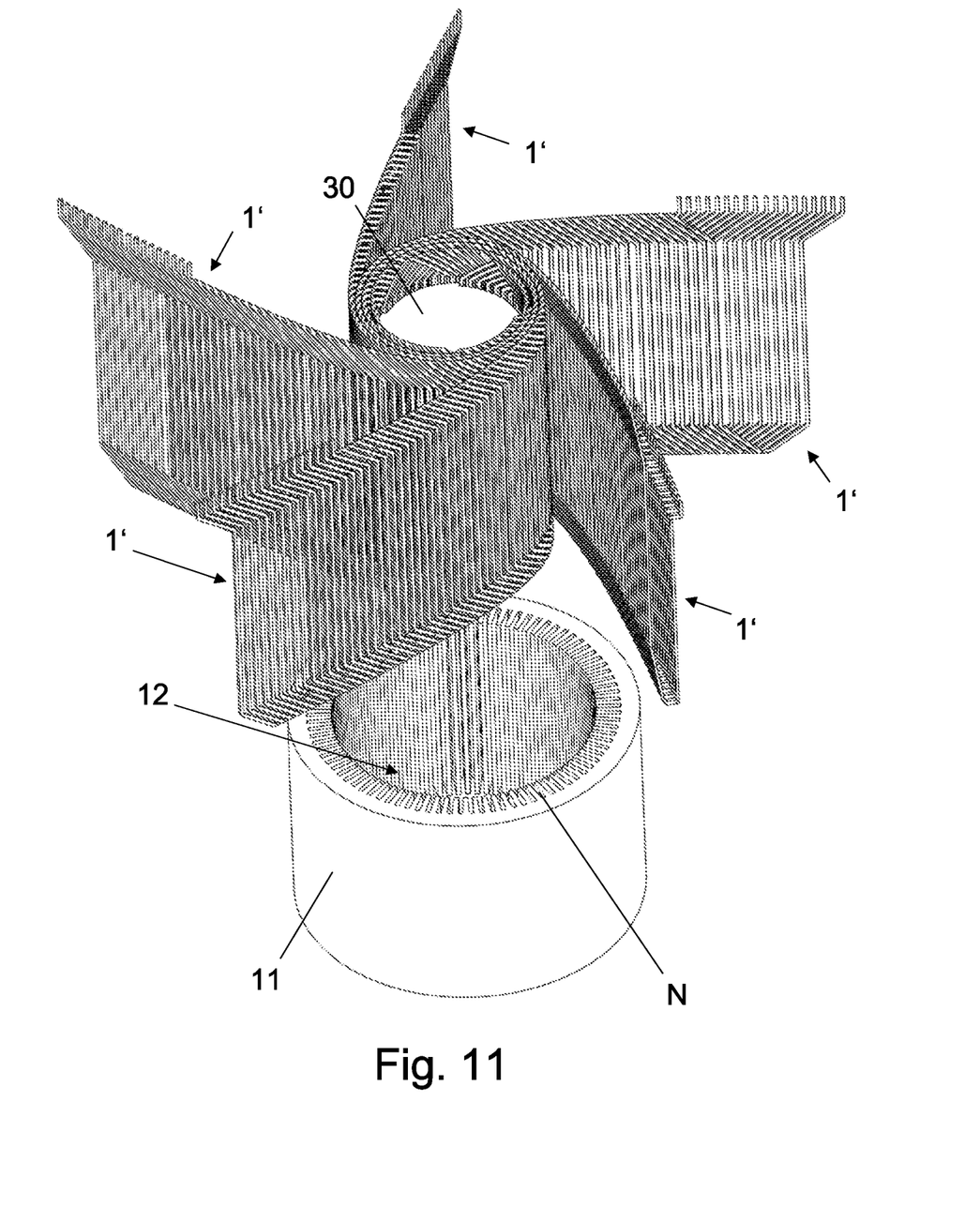
FIG. 11 shows a mandrel with a plurality of winding units as the winding units are wound onto the mandrel and a stator core in a perspective view.
Figure 12:
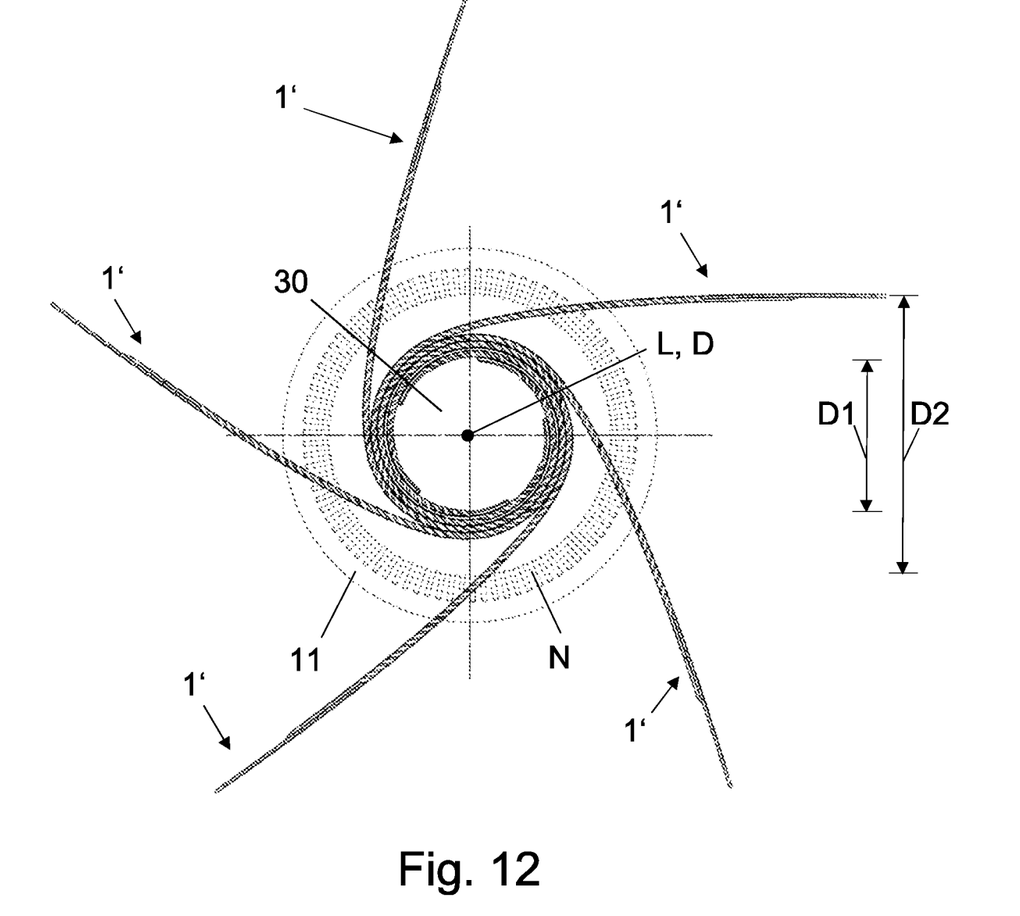
FIG. 12 shows a mandrel with a plurality of winding units as the winding units are wound onto the mandrel and a stator core in a side view.

The illustrations in FIG. 11 and FIG. 12 show a state that results from further rotation of the mandrel 30 in the first direction of rotation R1. Rotation continues until all the second ends of the winding units 1' opposite the first ends of the winding units 1' have come into contact with an outer contour of one of the winding units 1', i.e., until all winding units 1' are completely wound on the mandrel 30. In this state not shown in the drawings the stator winding formed by the winding units 1' wound onto the mandrel has an outside diameter smaller than the inside diameter D2 of the stator core 11. This circumstance allows the mandrel 30 together with the strip-shaped winding units 1' wound onto the mandrel 30 to be inserted into a cavity 12 of the stator core 11. The insertion is preferably made along a longitudinal axis L of the stator core 11.

The stator core 11 comprises a plurality of grooves N spaced apart in a circumferential direction, having a depth extending in the radial direction and allowing groove portions 3 of the strip-shaped winding units 1' to be arranged in a plurality of radially spaced apart radial positions.

After inserting the mandrel 30 into the stator core, the strip-shaped winding units 1' are unwound from the mandrel. For this purpose, the mandrel 30 is rotated in a second direction of rotation which is opposite to the first direction of rotation R1. In this process, the groove portions 3 of the strip-shaped winding units 1' are inserted into the grooves N of the stator core 11. In this way, radial compression and expansion of the winding conductors 2, 2' of the winding units 1' is avoided. The risk of undesirable deformation and/or damage can be reduced, allowing insertion into the stator core 11 that is gentle on the winding conductor 2, 2'. After being inserted into the stator core 11, the groove portions 3 are received in the grooves N of the stator core 11 in such a way that the strip-shaped winding units 1' are arranged spirally in the stator core 11.

In a subsequent method step, the first ends of the winding units 1' can then be released from the mandrel 30. The mandrel can then be removed from the cavity 12 of the stator core 11, preferably by a movement along the longitudinal axis L of the stator core 11.

LIST OF REFERENCE SYMBOLS 1, 1' Winding unit
2, 2' Winding conductor
3, Groove portion
4 Connection section
5 First end section
6, 6' Second end section
7 First subsection
8 Second subsection
9 Bending point
10 Stator
11 Stator core
12 Cavity
20 Stator winding
21 Part of a stator winding
30 Mandrel
31 Lateral surface
32 Step
33 Receiving wall
D Axis
L Longitudinal axis
L1, L2 Layer of the winding unit
N Groove
Q Transverse direction
R1 Direction of rotation

The invention claimed is:

1. A method for producing a stator for an electrical machine, the stator having a substantially hollow-cylindrical stator core, which has a plurality of grooves spaced apart in a circumferential direction, and the grooves have a depth in a radial direction, the method comprising the following steps:

provising at least one strip-shaped winding unit, which comprises a first winding conductor having a plurality of groove portions running straight in a transverse direction of the winding unit, the groove portions being mutually parallel;

fastening a first end of the strip-shaped winding unit to a lateral surface of a mandrel, the mandrel having an outside diameter that is smaller than an inside diameter of the stator core, wherein the lateral surface of the mandrel comprises a plurality of receiving walls spaced equally around an entire circumference of the mandrel, the plurality of receiving walls each being steps cut radially into or extending radially from the lateral surface of the mandrel, the first end of the strip-shaped winding unit being fastened to a receiving wall of the plurality of receiving walls, such that a plurality of strip-shaped winding units are connectable to the mandrel through the plurality of receiving walls;

winding the strip-shaped winding unit onto the mandrel such that the strip-shaped winding unit is bent around the lateral surface of the mandrel;

inserting the mandrel, together with the strip-shaped winding unit, into a cavity in the stator core; and unwinding the strip-shaped winding unit from the mandrel inserted into the cavity, the groove portions of the strip-shaped winding unit being inserted into the grooves of the stator core.

2. The method according to claim 1, further comprising rotating the mandrel in a first direction of rotation for winding up the strip-shaped winding unit and rotating the mandrel in a second direction of rotation opposite to the first direction of rotation for unwinding the strip-shaped winding unit or rotating the mandrel in the first direction of rotation for winding up the strip-shaped winding unit and rotating the stator core in the first direction of rotation for unwinding the strip-shaped winding unit with the mandrel being stationary.

3. The method according to claim 1, further comprising providing a plurality of the strip-shaped winding units and fastening the ends of the plurality of the strip-shaped winding units to the lateral surface of the mandrel with a predetermined angular spacing.

4. The method according to claim 3, further comprising the plurality of strip-shaped winding units being wound onto the mandrel such that the strip-shaped winding units are arranged in a spirally extending manner bent around the lateral surface of the mandrel.

5. The method according to claim 1, wherein the first winding conductor has a rectangular cross-section.

6. The method according to claim 1, wherein the first winding conductor is guided in a first and a second layer of the winding unit and comprises:
a. a plurality of first bent end sections, each of the first bent end sections interconnect two of the groove portions and are arranged on a first longitudinal side of the winding unit,
b. a plurality of second bent end sections, each of the second bent end sections interconnect two of the groove portions and are arranged on a second longitudinal side of the winding unit, the second longitudinal side being situated opposite the first longitudinal side, wherein
c. all of the first bent end sections each interconnect one said groove portion in a first layer and one said groove portion in a second layer,
d. exactly one of the second bent end sections for forming a reversal point of the winding conductor either
i. interconnects two of the groove portions in the first layer or
ii. interconnects two of the groove portions in the second layer, and all remaining ones of the second bent end sections each interconnect one said groove portion in the first layer and one said groove portion in the second layer.

7. The method according to claim 6, wherein the first winding conductor has two connection sections, which are either both arranged on the first longitudinal side or both arranged on the second longitudinal side.

8. The method according to claim 6, further comprising one or more second winding conductors formed identically to the first winding conductor and arranged to be offset such that the first and second winding conductors are arranged in the same first and second layers of the winding unit.

9. The method according to claim 1, wherein the stator core comprises a plurality of the grooves spaced apart in the circumferential direction and having a depth extending in the radial direction and allowing the groove portions of the strip-shaped winding unit to be arranged in a plurality of radially spaced apart radial positions, the groove portions being received in the grooves of the stator core such that the strip-shaped winding unit is spirally arranged in the stator core.

10. The method according to claim 9, wherein the groove portions are spaced apart in parallel by different distances.

11. The method of claim 1, wherein the winding of the strip-shaped winding unit onto the mandrel further includes the strip-shaped winding unit being bent spirally around the lateral surface of the mandrel.

12. A method for producing a stator for an electrical machine, the stator having a substantially hollow-cylindrical stator core which has a plurality of grooves spaced apart in a circumferential direction, and the grooves have a depth in a radial direction, the method comprising the following steps:

providing a plurality of strip-shaped winding units, each comprising a first winding conductor formed with a plurality of groove portions that extend straight in a transverse direction of the winding unit, the groove portions being mutually parallel, and the first winding conductors have a rectangular cross-section;

fastening a first end of each of the strip-shaped winding units to a lateral surface of a mandrel, wherein the lateral surface of the mandrel comprises a plurality of receiving walls spaced equally around an entire circumference of the mandrel, the plurality of receiving walls each being steps cut radially into or extending radially from the lateral surface of the mandrel, the first end of the strip-shaped winding units each being fastened to a receiving wall of the plurality of receiving walls, such that a plurality of strip-shaped winding units are connectable to the mandrel through the plurality of receiving walls;

winding the strip-shaped winding units onto the mandrel such that the strip-shaped winding units are bent around the lateral surface of the mandrel;

inserting the mandrel, together with the strip-shaped winding units, into a cavity in the stator core; and unwinding the strip-shaped winding units from the mandrel inserted into the cavity, the groove portions of the strip-shaped winding units being inserted into the grooves of the stator core with a radially stacked arrangement of the groove portions in each of the grooves.

13. The method according to claim 12, further comprising rotating the mandrel in a first direction of rotation for winding up the strip-shaped winding units and rotating the mandrel in a second direction of rotation opposite to the first direction of rotation for unwinding the strip-shaped winding units or rotating the mandrel in the first direction of rotation for winding up the strip-shaped winding units and rotating the stator core in the first direction of rotation for unwinding the strip-shaped winding unit with the mandrel being stationary.

14. The method of claim 12, wherein the plurality of strip-shaped winding units are wound onto the mandrel such that the strip-shaped winding units are arranged in a spirally extending manner bent around the lateral surface of the mandrel.

* * * * *